United States Patent [19]

Goettl

[11] 4,080,410

[45] Mar. 21, 1978

[54] EVAPORATIVE COOLER CONSTRUCTION

[76] Inventor: Adam D. Goettl, P.O. Box 1036, Phoenix, Ariz. 85016

[21] Appl. No.: 788,806

[22] Filed: Apr. 19, 1977

Related U.S. Application Data

[63] Continuation-in-part of Ser. No. 585,389, Jun. 9, 1975, Pat. No. 4,045,523.

[51] Int. Cl.² .............................................. B01D 1/00
[52] U.S. Cl. ........................................ 261/97; 52/476; 220/77; 261/106; 261/DIG. 41
[58] Field of Search ....................... 261/29, 30, 94–97, 261/99, 100–107, DIG. 15, DIG. 41; 220/62, 76, 77, 81 R; 52/476, 656

[56] References Cited

U.S. PATENT DOCUMENTS

| | | | |
|---|---|---|---|
| 1,898,591 | 2/1933 | Mohler et al. | 261/103 |
| 2,118,044 | 5/1938 | Gudmundsen | 261/30 X |
| 2,535,386 | 12/1950 | Brookins | 261/106 X |
| 2,778,203 | 1/1957 | Griffith | 261/30 X |
| 2,798,421 | 7/1957 | Hardesty | 261/29 X |
| 2,856,166 | 10/1958 | Goettl | 261/29 |
| 3,150,210 | 9/1964 | Goettl | 261/96 |
| 3,164,284 | 1/1965 | Bergh et al. | 220/76 X |
| 3,179,386 | 4/1965 | Liebmann | 261/97 X |
| 3,243,170 | 3/1966 | Ellis et al. | 261/94 |
| 3,284,068 | 11/1966 | Goettl | 261/97 |
| 3,491,746 | 1/1970 | Swimmer et al. | 261/DIG. 15 X |
| 3,497,188 | 2/1970 | McDuffee | 261/99 |
| 3,722,838 | 3/1973 | Swimmer et al. | 261/100 X |
| 3,955,702 | 5/1976 | Lundy | 220/81 R X |

FOREIGN PATENT DOCUMENTS

| | | | |
|---|---|---|---|
| 285,561 | 2/1928 | United Kingdom | 261/97 |

Primary Examiner—William A. Cuchlinski, Jr.
Attorney, Agent, or Firm—Wm. H. Dean; Don J. Flickinger; John A. Robertson

[57] ABSTRACT

The disclosure relates to an evaporative cooler construction having a frame comprising corner posts, a sump pan and a cover pan, together with pivotal access doors above and between the corner posts adapted to overlie and expose upper portions of evaporative cooler pad assemblies between the corner posts; said access doors also adapted to lock into place louver grills disposed between the corner posts and substantially flush with the outer extremeties thereof; the disclosure also relating to novel structural interconnection of the corner posts, the sump pan and the cover pan, as well as novel bayonet hinge structure connecting the access doors with the cover pan of the evaporative cooler construction.

15 Claims, 16 Drawing Figures

EVAPORATIVE COOLER CONSTRUCTION

This application is a continuation-in-part application of my co-pending application, Ser. No. 585,389, Filed 6-9-75, now U.S. Pat. No. 4,045,523 for an Evaporative Cooler with Superimposed Disposable Pad Assemblies.

BACKGROUND OF THE INVENTION

Evaporative coolers have been provided with various means for holding evaporative cooler pad assemblies and louver grills and various means for removeably retaining louver grills and for providing access to the evaporative cooler pad assemblies. However, many prior art evaporative cooler construction features have failed to provide simple access doors which properly expose upper portions of evaporative cooler pad assemblies and also properly lock louver grills in place at their upper edges. The prior art evaporative cooler structures have been somewhat difficult to service in many ways due to difficult access to the water trough structure and the upper portions of evaporative cooler pad assemblies to check for even flow of water into the troughs for efficient wetting of the pads in the pad assemblies and further, the prior art has afforded relatively difficult to to operate mechanism for retaining louver grills relative to the evaporative cooler frame and relative to respective evaporative cooler pad assemblies. Furthermore, the prior art has provided a great variety of frame and structural features which include sump pans, corner posts and top cover pans or top structures and these various mechanical features have heretofore been relatively expensive to produce and assemble.

SUMMARY OF THE INVENTION

The evaporative cooler construction of the present invention is provided with a novel assembly of a sump pan, a cover pan, corner posts and pad supporting platform members, all of which form a frame carrying evaporative cooler pads and external louver grills and cover members are hinged to the cover pan and extend over the upper portions of the evaporative cooler pad assemblies and are removeably engaged with upper portions of louver grills for holding them in position at the inlet sides of the evaporative cooler pad assemblies of the invention. The frame has normal features of construction in which the sump pan, at its sides and adjacent corners, is held together by offset portions of the corner posts of the invention; the corner posts having the offset portions such as to align with the inner and outer sides of the sump pan at the side walls thereof and such that slots between the offset portions receive the side walls of the sump pan for locking them together and in connection with the lower ends of the corner posts. The corner posts are hollow generally rectangular sheet metal structures, and are provided with inner corner portions having vertical flanges which extend in parallel relationship to the sides of the sump pan and which are at substantially right angles to each other, and secured to these flanges at the upper ends of the corner posts is the cover pan which has downwardly extending sides which are spaced apart at the corners and which fit over the aforementioned flanges so as to connect the cover pan to the corner posts. The aforementioned platform members are secured to upstanding sides of the sump pan and support lower extremeties of evaporative cooler pad assemblies. These platform members are perforate so as to allow for drainage of water from the pad assemblies into the sump pan.

The frame of the evaporative cooler construction of the invention is also provided with vertical dividers extending from the platform members to the cover pan and interconnecting these members. The vertical dividers being disposed to act as supports between a pair of hoirzontally adjacent evaporative cooler pad assemblies. These vertical dividers are provided with means for holding evaporative cooler pad assemblies in juxtaposition relative to the platform members so as to hold them in spaced relation to louver grills which are supported in connection with offset portions of the corner posts of the frame. Access doors of the invention are pivotally mounted in connection with the cover pan and are removeably connected thereto by means of bayonet hinge structures and are operable so as to open the area above the evaporative cooler pad assemblies for inspection of the flow of water into the troughs thereof and for various other servicing operations and the access doors also are generally L-shaped in cross section and extend from a position at respective sides of the cover pan to outermost extremeties of the frame and downwardly extending portions of these access doors overlap and engage upper edge portions of louver grill assemblies and frictionally lock in connection with the corner posts so as to hold the upper edge portions of the louver grill assemblies in substantial contact with the corner posts of the frame of the invention.

The louver grill structure and the evaporative cooler pad frame structure of the invention are provided with overlapping portions around their edges which effectively seal against the flow of air over and around the perimeter of the evaporative cooler pad so as to prevent the entrainment of water droplets in the air passing through the evaporative cooler of the invention. Accordingly, the air passing through the louver grill is directed solely through the evaporative cooler pad without allowing any of the air to pass around the trough area of the cooler pad or other peripheral areas such that the entire cross sectional area of the cooler pad is rendered operational to an optimum degree and such that aerosol water droplets are not entrained in the air by air passing around the trough area and outer edges of the evaporative cooler pad frame.

Accordingly, it is an object of the present invention to provide a very novel economically produceable evaporative cooler construction.

Another object of the invention is to provide an evaporative cooler construction having a frame, including a sump pan and cover pan with corner posts interconnecting the sump pan and cover pan, platform members supporting evaporative cooler pad assemblies between the corner posts and access doors pivotally connected with the cover member and disposed over the areas of the evaporative cooler pad assemblies so as to be openable thereover and to provide access thereto.

Another object of the invention is to provide an evaporative cooler construction having novel features which facilitate the economic production of evaporative cooler frames and evaporative cooler pad assemblies and louver grills in connection therewith.

Another object of the invention is to provide novel structure for interconnecting corner posts of an evaporative cooler with respective sump pan and cover pan structures.

Another object of the invention is to provide a novel evaporative cooler construction having novel frame structure including a sump pan, corner posts, cover pan and platform members for supporting evaporative cooler pad assemblies in the frame of the invention.

Another object of the invention is to provide an evaporative cooler construction wherein access doors above the evaporative cooler pad assemblies are provided with novel L-shaped hinges which are fitted into slots at the intersections of the top and the sides of the cover pan and pivot 90° freely to permit opening and closing of the access door relative to upper portions of evaporative cooler pad assemblies, and also these L-shaped hinge members are slideable in said slots to provide for bayonet engagement thereof or to provide for disengagement thereof and removal of the access doors relative to the cover pan without the use to any tools.

Another object of the invention is to provide a novel means by which evaporative cooler louver grills may be held in place by a pivoted access door which is generally L-shaped in cross section and pivoted to the cover pan of the frame structure and extending outwardly and downwardly over the upper edge of the louver grill structure so as to hold it securely in engagement with the corner posts of the frame of the construction.

Another object of the invention is to provide means for sealing against the flow of air from the louver grill around the periphery or trough areas of the evaporative cooler pad structure so as to prevent the entrainment of water droplets from the trough area and peripheral portions of the evaporative cooler pad frame.

Further objects and advantages of the invention may be apparent from the following specification, appended claims and accompanying drawings.

DESCRIPTION OF THE PREFERRED EMBODIMENTS

Figure 1:
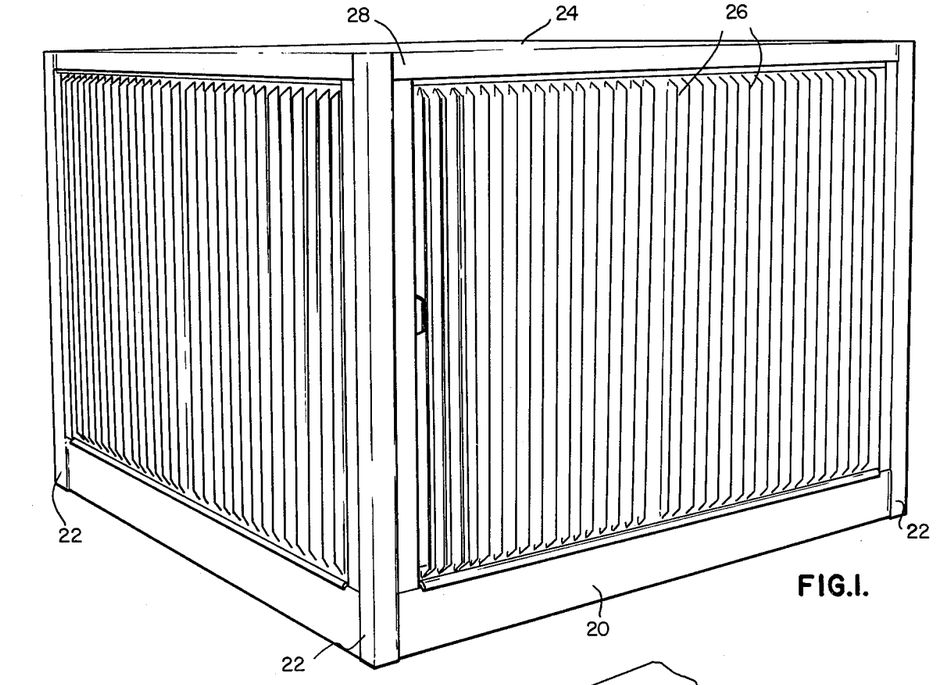
FIG. 1 is a perspective view of an evaporative cooler construction in accordance with the invention.

As shown in FIG. 1 of the drawings, the evaporative cooler construction of the invention is provided with a sump pan 20, corner posts 22, a cover pan 24, louver grills 26 and access doors 28.

Figure 6:
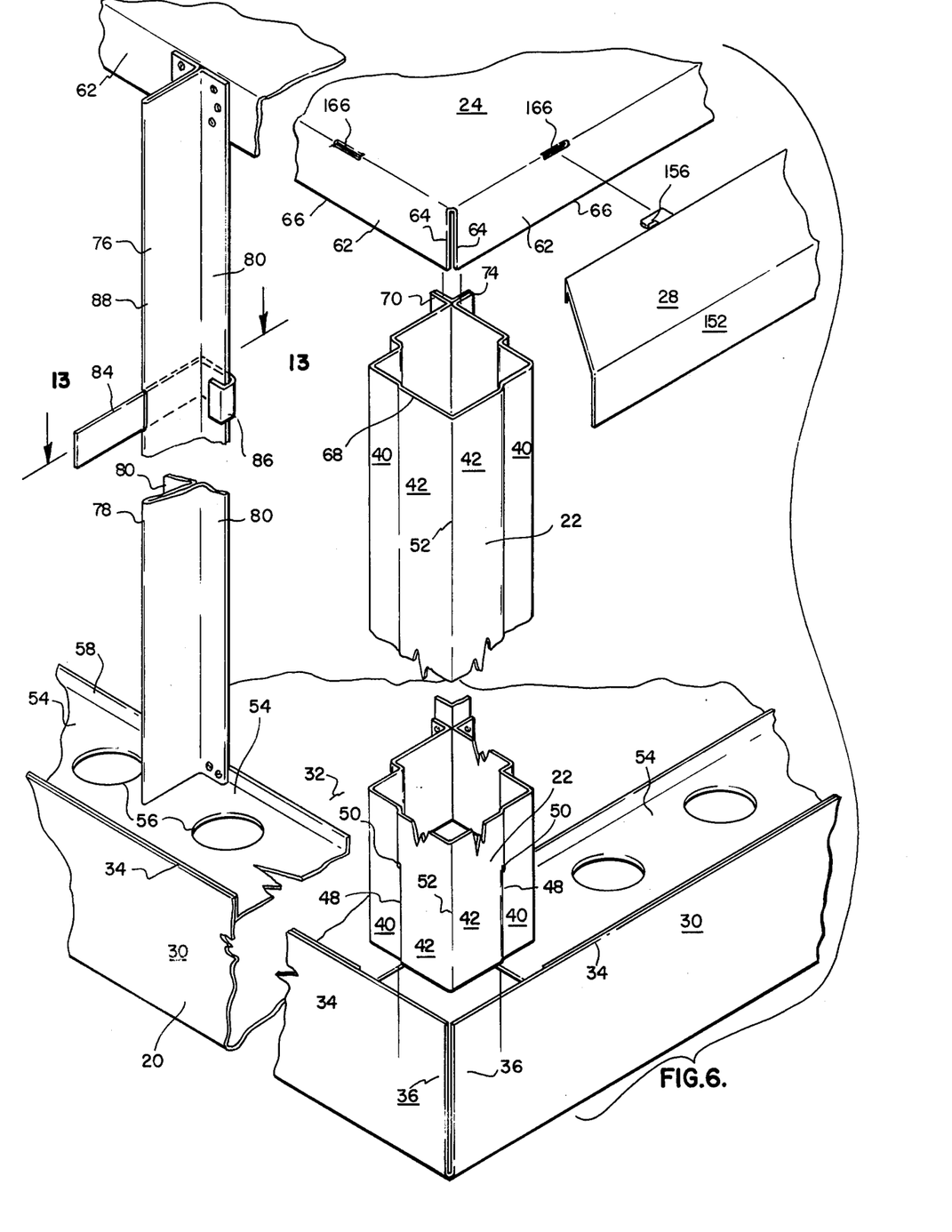
FIG. 6 is a fragmentary exploded view of sump pan, corner post, cover pan, platform structure and vertical divider structure of the frame of the invention together with pivoted access door structure related thereto.

Referring to FIG. 6 of the drawings, it will be seen that the sump pan 20 is provided with sides 30 which are generally vertical and are integral with a bottom portion 32. The sides 30 are provided with upper edges 34, and adjacent ends 36. At the adjacent ends 36, the sump pan 20 is provided with a respective corner which is connected to a respective corner post 22.

Figure 11:
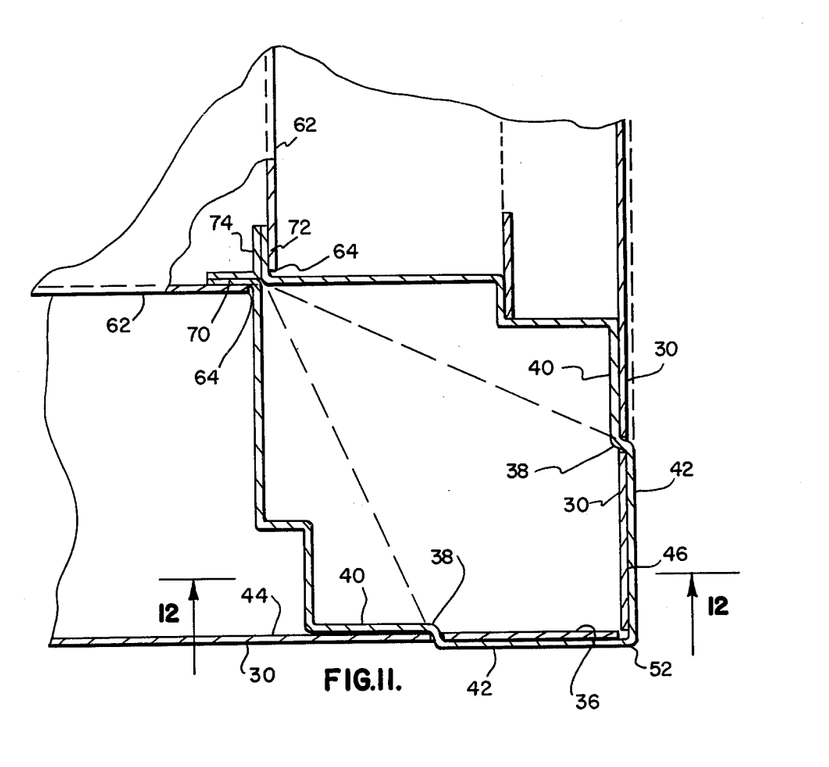
FIG. 11 is a plan sectional view taken from the line 11—11 of FIG. 7.

Each corner post 22, as shown in FIGS. 6 and 11 of the drawings, is provided with a pair of offset portions 38 comprising side portions 40 and 42. The side portions 42 extend to the outer extremeties of the corner posts and the side portions 40 extend inwardly such that the side portions 40 engage inner sides 42 of the side walls 30 of the sump pan 20, while the outer side portions 42 of the offset portions engage outer sides 46 of the sides 30 of the sump pan 20, and at the offset portions 38 are slots 48, shown best in FIGS. 6 and 8 of the drawings. These slots 48 are provided with uppermost erminal portions 50 which fit over the upper edge portions 34 of the sides 30 of the sump pan 20, and thus, the outer side portions 42 of the corner posts 22 retain the adjacent ends 36 of the sides 30 of the sump pan 20 interconnected with each other at the corners of the evaporative cooler construction.

The outer side portions 42 of the corner posts are integral with each other at the corner extremities 52 thereof, all as shown best in FIGS. 6 and 11 of the drawings.

Figures 7, 13:
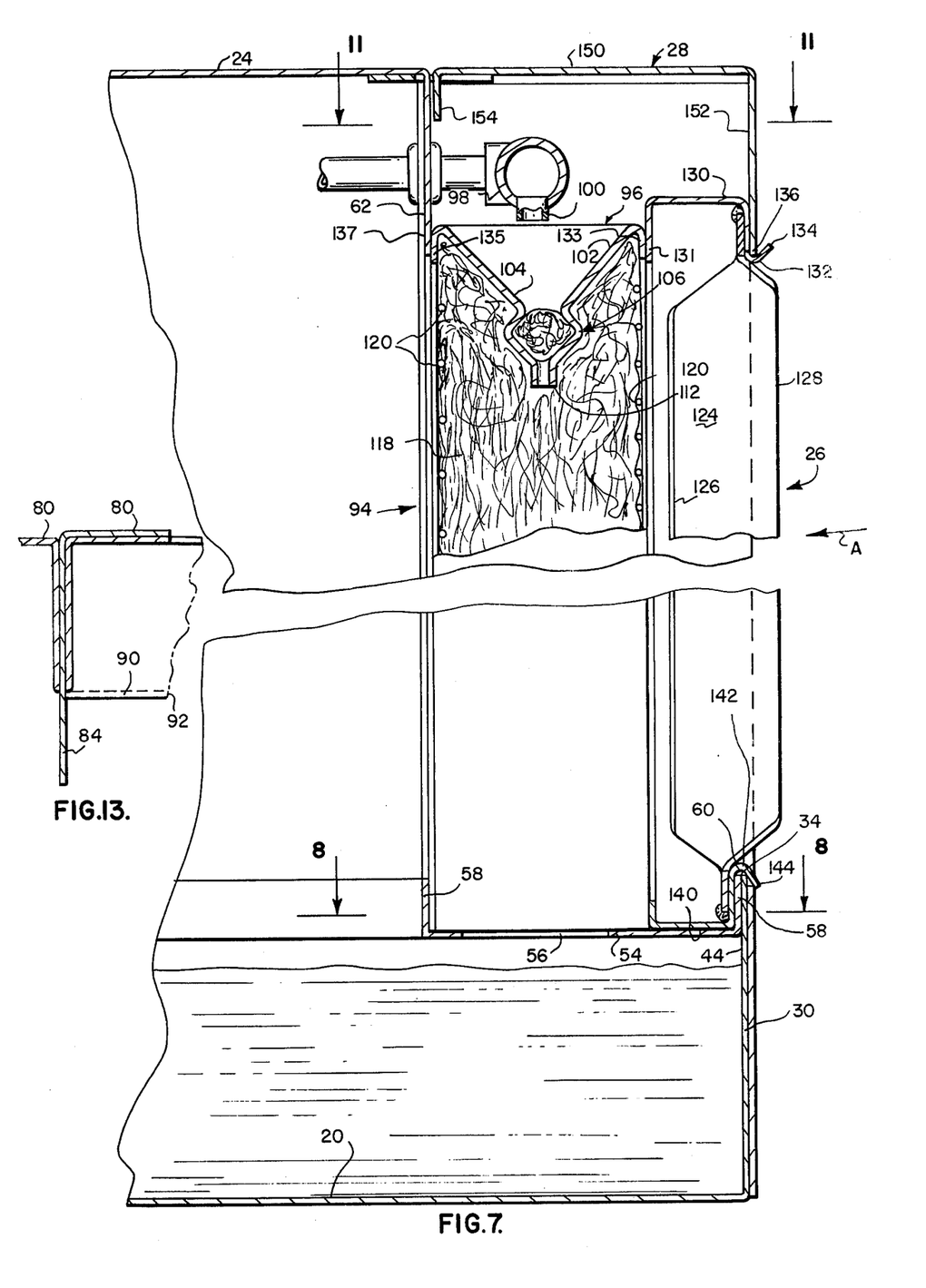
FIG. 7 is a vertical sectional view showing fragmentarily structure of the evaporative cooler construction of the invention.
FIG. 13 is a fragmentary sectional view taken from the line 13—13 of FIG. 6.

Platform members 54 are generally channel shaped in cross section, as shown in FIG. 7 of the drawings and also in perspective in FIG. 6 of the drawings. These platform members 54 are thus provided with a bottom portion having openings 56 therein for drainage purposes and opposed upstanding flanges 58, one of which is fixed to the inner side 44 of a respective side portion 30 of the sump pan 20. The respective platform member 54 shown in FIG. 7 is provided at its flange portion 58 with an upper edge 60 which is substantially flush with the respective upper edge 34 of the respective side 30 of the sump pan 20.

Figure 8:
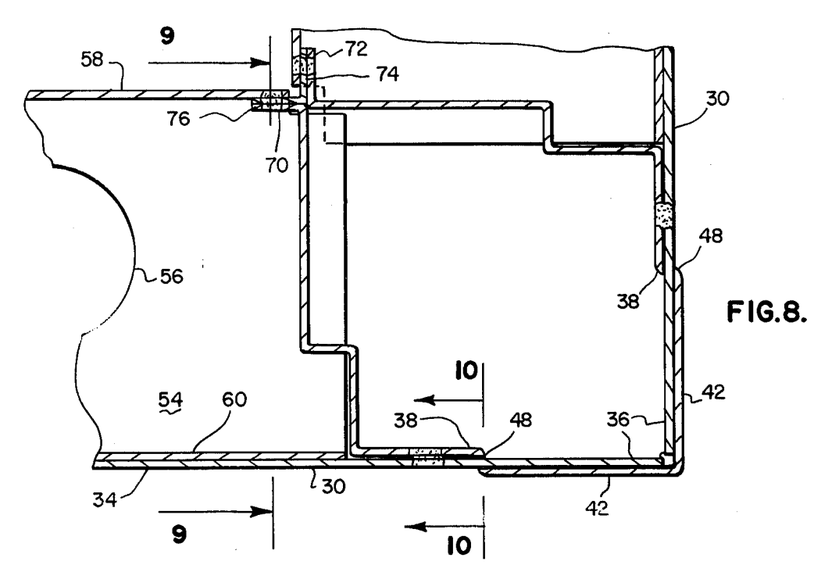
FIG. 8 is a fragmentary plan sectional view taken from the line 8—8 of FIG. 7.
Figure 9:
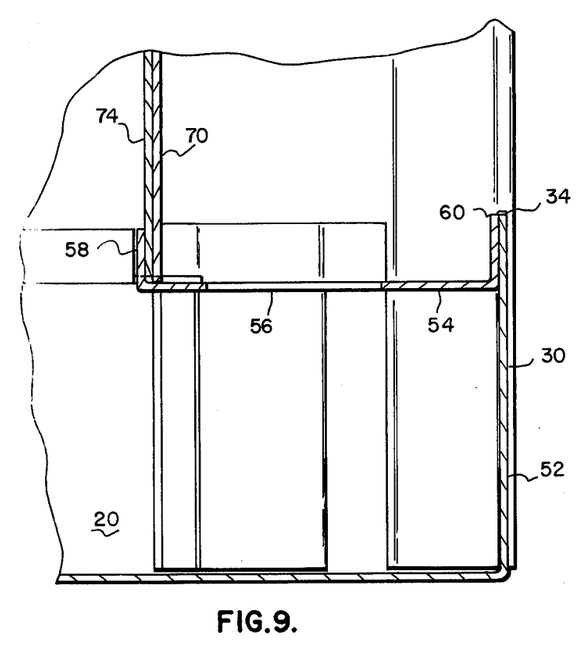
FIG. 9 is a fragmentary sectional view taken from the line 9—9 of FIG. 8.
Figure 10:
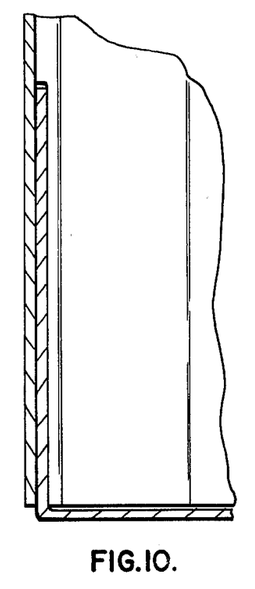
FIG. 10 is an enlarged fragmentary sectional view taken from the line 10—10 of FIG. 8.

As shown best in FIGS. 6 and 8 of the drawings, the cover pan 24 is provided with downwardly directed sides 62 which have adjacent ends 64 slightly spaced apart. The sides 62 have normally lower edges 66. Each corner post 22 is provided with an upper end 68 and each corner post is generally a rectangular hollow cross sectional structure having a pair of flanges 70 and 72 almost directly opposite the corner extremety 52 which is at the outer portion of each frame member. The flanges 72 are interconnected by an angle member 74 and the spaced apart adjacent end 64 of the adjacent side 62 of the cover 24 straddle the juncture of the flanges 70 and 72 and these structures are secured together by welds, such as shown at 76 in FIG. 8 of the drawings.

Interconnecting a flange 58 of each respective platform member 54 and a respective side 62 of the cover pan 24 is a vertical divider 76 which is generally T-shaped in cross section and having an outwardly extending divider portion 78 and a pair of oppositely extending flanges 80 which are disposed in parallel relation with the connected to, by welding or otherwise, the respective side 62 of the cover pan 24. The flanges 80 at their lower ends are spot welded or otherwise secured to the upwardly extending flange of the respective platform member 54.

As shown in FIGS. 6 and 13, each divider member 76 is formed of sheet metal and folded construction and a deflectable clip 84 is disposed between folded portions of the T-shaped in cross section vertical divider and an end portion 86 is folded around one of the flanges 80 of the divider 76 so as to provide a deflectable portion of the member 84 extending beyond the outermost edge 88 of the vertical divider 78. As shown in FIG. 13, this extending portion may be folded into a broken line position 90 so as to engage a side 92 of an evaporative cooler pad assembly 94, as will be hereinafter described in detail.

Each evaporative cooler pad assembly 94 is provided with a trough structure 96 adapted to receive water from a manifold 98 and downwardly depending nozzles 100. The trough structure 96 comprises a pair of downwardly converging trough side portions 102 and 104 which are integral with diverging converging filter holding structure 106; the filter holding trough structure having drain openings 112.

The trough portions 102 and 104 are spaced apart such that water pssing from the respective nozzles 100 may pass down into the filter holding trough portion 106 and downwardly through the outlets 112 whereupon the water then flows downwardly through hydroscopic fiberous material 118 of the evaporative cooler pad assembly. This fiberous material may be such as quaking aspen fiber or any other suitable material.

This material is retained by a foraminous frame structure 120 formed of wire or other mesh like material so as to retain the fiberous material 118 in juxtaposition in the pad assembly.

Figure 2:
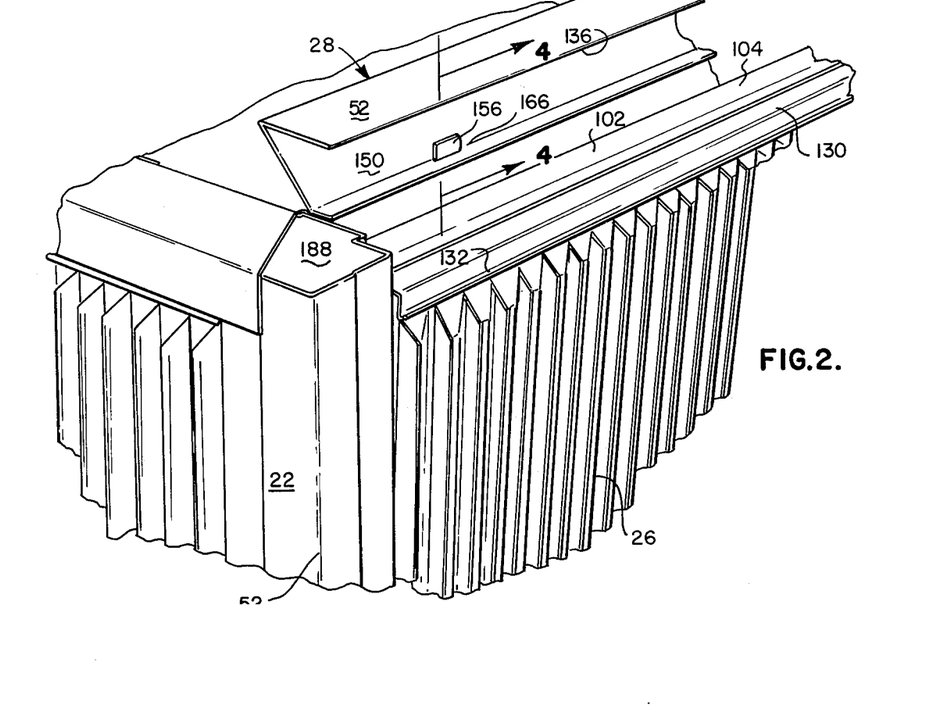
FIG. 2 is an enlarged fragmentary perspective view of one corner of the evaporative cooler construction shown in FIG. 1 and showing an access door of the invention in open position relative to the upper edge of a louver grill and also to expose the upper portions of an evaporative cooler pad assembly located behind the louver grill and between the corner posts of the frame of the invention.

As shown in FIGS. 1, 2 and 7 of the drawings, each evaporative cooler pad assembly 94 is provided with an inlet side 122 which is at the extremety of the mesh like frame structure of each evaporative cooler pad assembly, and, each louver grill 26 is provided with vertical louver portions 124 having inward extremeties 126 which are spaced from the inlet extremeties 122 of each evaporative cooler pad assembly. Each louver portion 124 is provided with an inlet or leading edge 128 at the outer side of the evaporative cooler construction of the invention and air flow through the respective louver grill 26 and evaporative cooler pad assembly 94 is generally in the direction of an arrow A, as shown in FIG. 7 of the drawings. It will be seen that the louver portions 124 are generally vertical and that they are connected at their upper edges by a horizontal frame member 130 having a generally U-shaped hook portion 132 terminating in an upwardly extending edge 134 thereby providing an upwardly directed channel which is engageable by a lower edge 136 of a respective access door 138, as will be hereinafter described. Each louver grill assembly 26 is provided with a horizontal frame element 140 having a generally horizontal hook shaped channel portion 142 having a downwardly directed edge 144. This hook shaped channel 142 rests upon the upper edges 34 and 60 of the hereinbefore described respective side wall 30 and flange 58 of the sump pan 20 and respective platform member 54 as shown in FIG. 7 of the drawings.

As shown in FIG. 7 of the drawings, the horizontal frame member 130 connected with the louver grill 26 is provided with a downwardly extending flange 131 which overlaps a contiguous upper portion 133 of the frame of the evaporative cooler pad 94 and, at the outlet side of the evaporative cooler pad 94 the upper portion of the frame designated 135 overlaps a lower portion 137 of the cover pan skirt 62. Thus, air is prevented from passing around outer edges of the evaporative cooler pad and thereby forcing all of the air to pass through the fiberous material 118. Thus, air is prevented from leaking into various areas around the edges of the evaporative cooler pad and to pick up droplets of water which may be issuing from the trough feeding nozzles above the evaporative cooler pad the around outer edges of the evaporative cooler pad frame. Thus, air delivered beyond the evaporative cooler pad 94 is air properly evaporatively cooled, but devoid of water droplets which may tend to damage blower operating motors or other equipment inside the evaporative cooler. Furthermore, the prevention of the flow of water droplets into the air stream effectively obviates other problems which may happen in the duct work or other areas devoted to delivering cool air into a building room.

Disposed above each evaporative cooler pad assembly 94 and connected to each respective side 62 of the cover pan 24 is an access door 28 shown in detail in FIGS. 3, 4, 5, 6 and 7.

As shown in FIG. 7 of the drawings, the cross sectional shape of each access door 28 is generally L-shaped with a generally horizontal top cover portion 150 and a vertical side portion 152 which terminates in the edge 136 which fits in the horizontally disposed channel shaped portion 132 of the louver grill frame portion 130, as hereinbefore described.

Figures 3, 4:
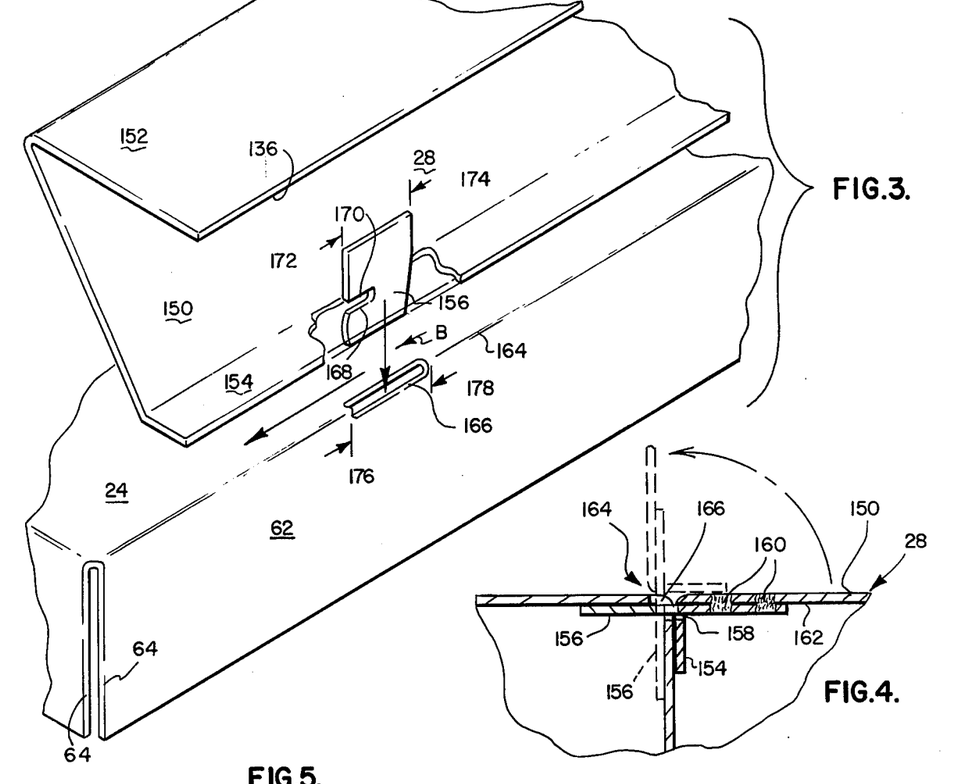
FIG. 3 is an enlarged fragmentary perspective view of an access door relative to an upper corner of an inverted cover pan of the invention and showing a bayonet hinge structure in exploded condition as it may be assembled and disassembled for connecting or disconnecting the access door to the cover pan.
FIG. 4 is a fragmentary sectional view taken from the line 4—4 of FIG. 2.

Integral with the top or cover portion of the access door 28 is a downwardly directed flange 152 shown best in FIG. 7 of the drawings, and also in FIG. 3 of the drawings with the access door in open position. Each access door 28 is hingedly connected to the cover pan 24 by means of a bayonet hinge member 156 which extends through an opening 158 in the respective flange 154, shown in FIG. 4 of the drawings. This hinge member 156 is secured by welds 160 to the cover portion 150 of the access door 28. It will be noted that the opening 158 is extended to an upper inner side 162 of the portion 150 of the access door 28 so that the bayonet hinge member 156 is contiguous with and parallel to the portion 150 or the horizontal portion of the access door 28.

Disposed in the cover pan 24 at a corner 164 thereof is a hinge receiving slot 166. This slot 166 in the corner is extended substantially 90 degrees such that it extends into each respective side 62 and into the respective top 24. The slot 166 being shown in detail in FIG. 4 of the drawings so as to allow free movement of the bayonet hinge 156 from the solid line position shown in FIG. 4 to the broken line position shown therein. Thus, the slot 166 is sufficiently wide to permit the angular freedom of the bayonet hinge 156, shown particularly in FIGS. 3, 4 and 5 of the drawings.

The bayonet hinge member 156 is provided with a generally L-shaped hook portion 168 provided by a slot 170. The width of the bayonet hinge 168 is indicated between the arrows 172 and 174. This width is slightly less than the distance indicated between the arrows 176 and 178 at opposite ends of the slot 166 so that the bayonet hinge 156 may first be inserted through the slot 156 and then moved in the direction of an arrow B in FIG. 3 of the drawings, so as to position the hook portion 168 beyond an end portion 180 of the slot 166, all as shown best in FIG. 5 of the drawings.

Figures 14, 15, 16:
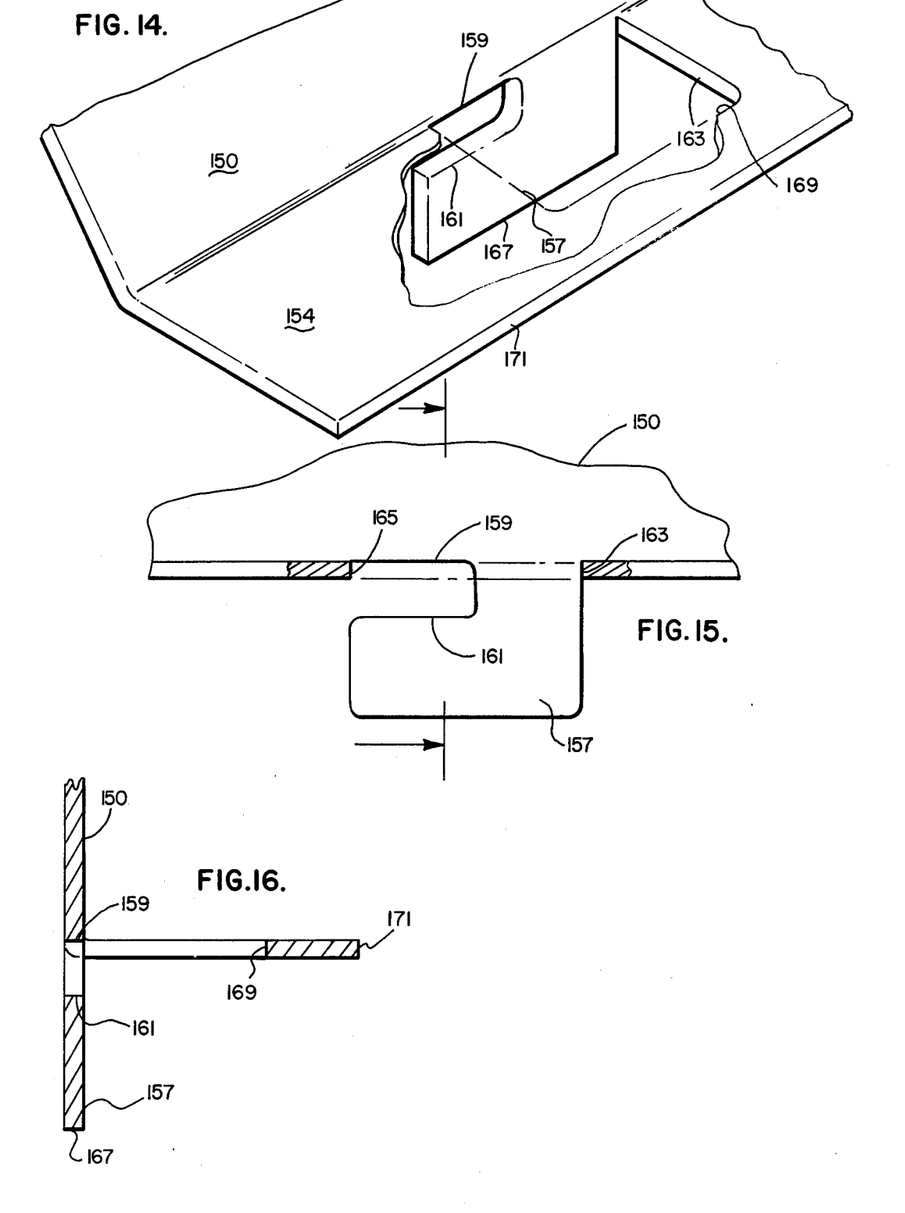
FIG. 14 is a view similar to a portion of FIG. 3 of the drawings showing a modification of the invention.
FIG. 15 is a view taken from the line 15—15 of FIG. 14.
FIG. 16 is a sectional view taken from the line 16—16 of FIG. 15.

In the modification, as shown in FIG. 14, an L-shaped bayonet hinge member 157 is struck out of the flange 154 of the moveable cover 150 and this is accomplished by shearing at 163 and 165 through the flange 154 to a break line 155 between the flange 154 and the top portion 150 of the pivoted cover. The tab sheared out between the portions 163 and 165 is then formed at right angles to the flange 154 and is provided with a slot having opposite sides 159 and 161 so as to provide for a free end 167 of the L-shaped member which may interlock beyond the end of the slot 166 in a similar manner to that described in connection with the bayonet hinge member 156. This member 156 being specifically shown as a separate part in FIGS. 3, 4 and 5 is thus formable by blanking it out of the flange 154, all as shown best in FIGS. 14, 15 and 16.

As shown best in FIGS. 14, 15 and 16, the bayonet hinge member 157 is provided with an edge 167 which is sheared from the flange 154 at 169, thereby leaving a continuous strip of metal extending between the edges 169 and 171, as shown in FIG. 16, as well as in FIG. 14. This provides for a continuity of the structural strength of the flange 154 as it extends beyond the blanked out bayonet hinge member 157. It will be seen in FIG. 14 that the hinge member 157 is provided with an edge 167 which is sheared from the edge 169 and that this is spaced inwardly from the outer edge 171 of the flange 154 and thus structural continuity of the flange 154 is preserved as the bayonet hinge member 157 is struck and sheared therefrom.

Figure 5:
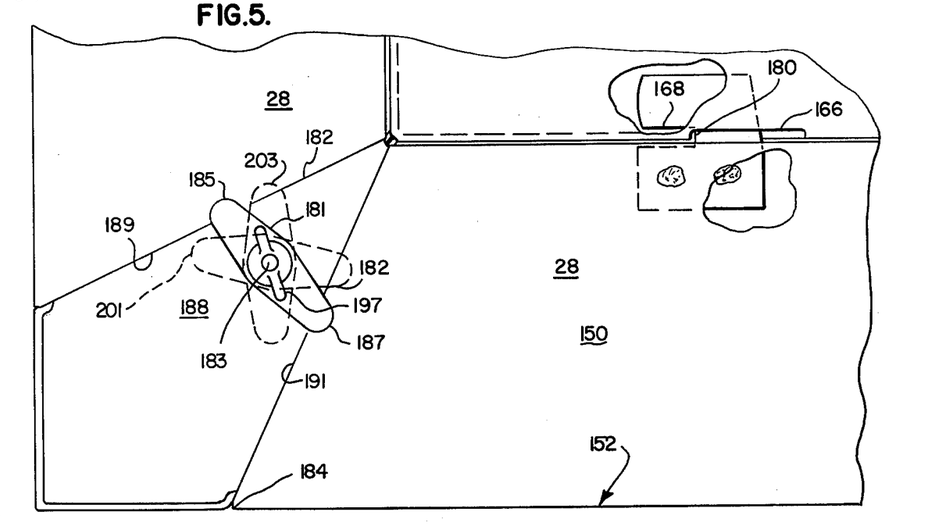
FIG. 5 is a fragmentary top or plan view of one of the corners of the evaporative cooler construction showing portions thereof broken away to expose details of the bayonet hinge structure which pivotally interconnects the access doors of the invention with the respective sides of the cover pan of the frame structure of the invention.

FIG. 5 is a plan view of the corner of the evaporative cooler construction of the invention and each access door 28 is provided with end portions 182 which are disposed at an angle to the longitudinal outer side portions 152 and the sides 152 are provided with end portions 184 which coincide with the hereinbefore described offset portions 38 of the respective corner posts and these portions 184 resiliently and frictionally engage the corner posts at the offset portions 38 so as to positively hold the lower edge of the side portions 152 of the respective access door 28 firmly in engagement with the outer side of a respective louver grill 26 and with the edge 136 in the channel shaped frame member of the respective louver grill 26, all as shown best in FIG. 7 of the drawings.

Figure 12:
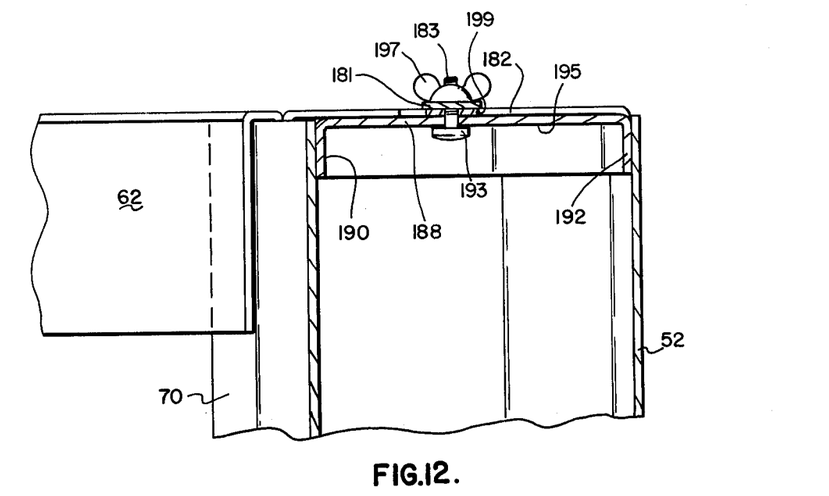
FIG. 12 is a fragmentary sectional view taken from the line 12—12 of FIG. 11.

At the top of each corner post 22 is a cover plate 188; this cover plate 188 being shown in section in FIG. 12 of the drawings. This cover 188 is provided with downwardly directed flanges 190 and 192 which are fixed to inner surfaces of the corner posts at their upper ends so as to enclose the upper ends of the corner posts between the respective ends 182 of the access doors 28.

In addition to the foregoing features which hold the access doors 28 in closed position as shown in FIGS. 5 and 12 of the drawings, it will be seen that a pivoted latch member 181 is pivoted on a clamp bolt 183 and this member 181 is provided with opposite ends 185 and 187 which overlap edges 189 and 191 of adjacent access doors 28.

As shown in FIG. 12, the bolt 183 is provided with a head 193 fixed to and held captive against an underside 195 of the member 188 at the top of each corner post. The respective bolt 193 is provided with a wing nut 197 which engages a normally upper side of the respective member 181 and a washer 199 is disposed between the top side of each member 188 and the respective rotary latch member 181.

As shown in FIG. 5, the wing nut 197 may be loosened to allow the latch member 181 to be moved to a broken line position 201 wherein the edge 191 of the respective access door 28 is overlapped and held in locked position. Whereas, the latch member 185 may be moved to a broken line position 203 wherein the edge 189 of the adjacent access door 28 may be overlapped and held locked while the access door 28 at its edge 191 is free to be moved toward open position.

It will be appreciated that a plurality of the bayonet hinges 156 may be engaged in respective slots 166 of the cover pan 24, all as hereinbefore described.

It will be understood that the access doors 28, by reason of the bayonet hinges 156 may readily be removed from the cover pan 24 or may be pivoted upwardly into an open position such as indicated by broken lines in FIG. 4 of the drawings. It will be apparent that this simple access door 28 and its simple hinge mechanism provides a very efficient and easily operable means by which the louver grills 26 may be held in juxtaposition at the inlet sides of the evaporative cooler construction of the invention, and whereby operation of the access door may expose the trough structure at the upper end of the evaporative cooler pad assembly for general servicing as well as to permit removal of the louver grill assembly 26 and to thereby permit easy and simple replacement of the evaporative cooler pad assemblies 94 as may be desired.

It will be obvious to those skilled in the art that various modifications may be resorted to without departing from the spirit of the invention.

I claim:

1. An evaporative cooler construction comprising: a generally rectangular sump pan having a bottom and surrounding sides; said sides having inner and outer surfaces; said sides having upper edges faced upwardly from said bottom; perforate platform members fixed to said sides above said bottom and disposed below said upper edges of said sides; said sides having adjacent ends; generally vertical corner posts having upper and lower ends and disposed in overlapping relation to said adjacent ends of said sides of said pan; said corner posts having corner extremeties directed outwardlly away from said sump pan; said platform members having ends spaced from said adjacent ends of said sides of said sump pan; said corner posts disposed between said ends of said platform members; each corner post having first side portions disposed adjacent and parallel to inner surfaces of said sides of said sump pan; each corner post having offset side portions disposed adjacent and parallel to outer surfaces of said sides of said pan; said corner posts having slots between said first side portions and said offset side portions thereof; said slots holding sides of said sump pan therein; said offset side portions of said corner posts integral with each other at said corner extremeties of said corner posts; said corner posts having inner corner extremeties comprising a pair of vertical flanges angularly disposed relative to each other; each of said flanges being substantially parallel to a respective side of said sump pan; a generally rectangular cover pan having corners and downwardly directed sides; said sides of said cover each having ends spaced a short distance from respective ones of said corners whereby adjacent ends of said sides of said cover are spaced apart at said corners of said cover; said flanges of said corner posts at their upper ends being disposed between said spaced apart ends of said corners of said cover; said flanges extending from said corners of said cover in parallel contiguous relation to said sides of said cover to thereby interconnect said sides of said cover with said upper ends of said corner posts.

2. The invention as defined in claim 1, wherein: said sides of said cover being spaced a substantial distance from said sides of said sump pan and said platform members extending from said sides of said sump pan into the proximity of said flanges of said corner posts; said platform members connected to said corner posts and partially supported thereby.

3. The invention as defined in claim 1, wherein: said corner posts are provided with step like offset portions; said offset portions being spaced from and parallel with said outer sides of said corner posts; a louver grill between each pair of vertical corner posts and disposed in spaced relation to said offset portions.

4. The invention as defined in claim 3, wherein: a vertical divider member extends upwardly from an intermediate portion of each of said platform members to one of said downwardly extending sides of said cover pan; said divider member secured to said platform member and a respective side of said cover pan and providing a separator between a respective pair of said corner posts whereby a pair of evaporative cooler pad assemblies may be supported at opposite sides of said corner posts; and evaporative cooler pads supported on said platform members at opposite sides of said vertical dividers; said vertical dividers having laterally extended flanges adjacent to which said evaporative cooler pad assemblies are disposed; said flanges of said corner posts extending toward said dividers and also providing lateral support for said evaporative cooler pad assemblies; and means for holding said evaporative cooler pad assemblies adjacent to said flanges and said laterally extending portions of said dividers.

5. The invention as defined in claim 1, wherein: said corner posts are generally rectangular in cross section hollow structures.

6. In an evaporative cooler a main frame; an evaporative cooler pad having an inlet side; said pad supported in one side of said main frame; an inlet louver grill supported by said frame adjacent to said inlet side of said evaporative cooler pad; said louver grill having a lower portion; said frame having a portion supporting said lower portion of said louver grill; said louver grill having an upper portion; a pivoted access door disposed above said cooler pad and pivotally mounted on said frame on a horizontal axis in spaced relation to said louver grill; said access door having means engageable with said upper portion of said louver grill; said access door thus retaining said louver grill in position in said frame relative to said evaporative cooler pad.

7. The invention as defined in claim 6, wherein: a cover pan is connected to said frame; said frame having outer extremeties; said cover pan having a top portion and downwardly extending sides; said downwardly extending sides spaced inwardly from said outer extremeties of said frame; said access door having bayonet hinge structure pivotally connecting it to said cover pan at an intersection at one of said sides and said top portion of said cover pan; said access door being generally L-shaped in cross section and thus having a horizontal portion and a vertical portion; said vertical portion disposed to overlie said louver grill at its outer uppermost portion; said bayonet hinge structure comprising a slot in said cover pan extending horizontally at an intersection of one of said sides and said top portion thereof; said access door having a generally L-shaped hinge member extended through said slot in said cover pan; a portion of said L-shaped portion extending beyond the end of said slot and when said access door is in open position, said L-shaped portion being slideable in said slot to a position wherein said L-shaped portion may be readily removed from said slot; the normally hinged position of said access door being displaced longitudinally of said slot so as to dispose an L-shaped end of said L-shaped portion beyond the end of said slot and in engagement with an inner portion of a respective side of said cover pan.

8. The invention as defined in claim 7, wherein: said L-shaped portion being pivotal substantially 90° between the top portion and the respective side portion of said cover pan; and the L-shaped portion being hooked and retained in and beyond one end of said slot.

9. The invention as defined in claim 7, wherein: said L-shaped hinge member is integral with said access door.

10. The invention as defined in claim 6, wherein: said access door at its opposite ends when in closed position having its vertical portions frictionally and resiliently engaged with outer sides of said frame so as to hold said access door in closed position for retaining the respective upper portion of said louver grill in juxtaposition relative to said frame.

11. The invention as defined in claim 10, wherein: said frame is provided with corner posts; said access doors having opposite ends angularly overlying upper portions of said corner posts; said corner posts having recess portions in the outer sides thereof within which said vertical portions of said access door are frictionally engaged and nested therein.

12. The invention as defined in claim 6, wherein: said access door is a generally inverted L-shaped in cross section structure having a normally horizontal portion and a downwardly extending vertical portion; said vertical portion disposed in overlying position relative to said upper portion of said louver grill to thereby retain said louver grill in a direction toward said frame.

13. In an evaporative cooler a main frame; an evaporative cooler pad having an inlet side; said pad supported in one side of the main frame; an inlet louver grill supported by said frame adjacent to said inlet side of said evaporative cooler pad; said louver grill having a lower portion; said frame having a portion supporting said lower portion of said louver grill; said louver grill having an upper portion; a pivoted access door disposed above said cooler pad and pivotally mounted on said frame on a horizontal axis in spaced relation to said louver grill; said access door having means engageable with said upper portion of said louver grill; said access door thus retaining said louver grill in position in said frame relative to said evaporative cooler pad; said frame having corner posts; said access doors having opposite ends angularly overlying upper portions of said corner posts; pivoted latch members pivoted on said corner posts and overlying opposite ends of said access doors to thereby hold them down and prevent them from being pivoted upwardly about said horizontal axis.

14. The invention as defined in claim 13, wherein: said pivoted latch member is pivoted on a vertical axis between said opposite ends of said access doors and wherein screwthreaded means is provided for tightening said pivoted latch members so as to hold them in place in overlapping relationship with said opposite ends of said access doors.

15. The invention as defined in claim 13, wherein: said opposite ends of adjacent access doors being divergingly disposed relative to each other; each pivoted latch being pivoted between said divergingly disposed ends; said pivoted latch member when pivoted in one direction releasing an end of one access door and concurrently locking the end of the adjacent access door.

* * * * *